US012563255B2

(12) United States Patent
Yokohata

(10) Patent No.: US 12,563,255 B2
(45) Date of Patent: *Feb. 24, 2026

(54) COMMENT DISTRIBUTION SYSTEM, COMMENT DISTRIBUTION SERVER, TERMINAL, COMMENT DISTRIBUTION METHOD, AND PROGRAM

(71) Applicant: DWANGO Co., Ltd., Tokyo (JP)

(72) Inventor: Satoshi Yokohata, Tokyo (JP)

(73) Assignee: DWANGO Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,005

(22) Filed: Jul. 25, 2024

(65) Prior Publication Data

US 2024/0406491 A1 Dec. 5, 2024

Related U.S. Application Data

(63) Continuation of application No. 18/012,646, filed as application No. PCT/JP2021/026480 on Jul. 14, 2021, now Pat. No. 12,081,823.

(30) Foreign Application Priority Data

Jul. 28, 2020 (JP) ................................. 2020-127116

(51) Int. Cl.
*H04N 21/431* (2011.01)
*H04N 21/235* (2011.01)
*H04N 21/81* (2011.01)

(52) U.S. Cl.
CPC ....... *H04N 21/4316* (2013.01); *H04N 21/235* (2013.01); *H04N 21/8146* (2013.01)

(58) Field of Classification Search
CPC ............. H04N 21/4316; H04N 21/235; H04N 21/8146; H04N 21/4788; G06F 13/00
See application file for complete search history.

(56) References Cited

U.S. PATENT DOCUMENTS

2010/0165396 A1* 7/2010 Yamaguchi .......... H04N 21/654

FOREIGN PATENT DOCUMENTS

| JP | 2008278088 A | 11/2008 |
| JP | 2009296484 A | 12/2009 |

(Continued)

OTHER PUBLICATIONS

JP2024176304 Office Action dated Jun. 10, 2025, 6 pgs.

(Continued)

*Primary Examiner* — Anthony Bantamoi
(74) *Attorney, Agent, or Firm* — Bracewell LLP; Doug Stewart; Patrick J. Connolly

(57) ABSTRACT

This comment distribution system includes a contributor terminal, a video distribution server, a comment distribution server that distributes comments input regarding the video, and a viewer terminal for displaying the video and comments received. The comment distribution server includes a comment receiving part for receiving comments, a comment classifying part for classifying the comments into first comments that are displayed both in a video display area and in a comment field outside the video display area and second comments that are displayed only in the comment field, and a comment distributing part for distributing the first comments and the second comments. The viewer terminal includes a video display part for displaying video received and a comment receiving part for receiving the first comments and the second comments. The video display part displays the first comments in both the video display area and the comment field and displays the second comments in only the comment field.

9 Claims, 5 Drawing Sheets

(56)         References Cited

FOREIGN PATENT DOCUMENTS

| | | | |
|----|------------|---|---------|
| JP | 2010152813 | A | 7/2010 |
| JP | 2011118730 | A | 6/2011 |
| JP | 2018023003 | A | 2/2018 |
| JP | 2018110377 | A | 7/2018 |
| JP | 2019197961 | A | 11/2019 |
| JP | 2019213933 | A | 12/2019 |
| KR | 20010090097 | A | 10/2001 |

OTHER PUBLICATIONS

PCT/JP2021/026480 International Search Report dated Sep. 21, 2021, 2 pgs.
JP2023134598 Notice of Reasons for Refusal dated Oct. 24, 2023, 5 pgs.
JP2023-134598 Office Action dated Feb. 13, 2024, 6pgs.
JP2024176304 Japanese Office Action dated Oct. 7, 2025, 11 pgs.

* cited by examiner

COMMENT DISTRIBUTION SYSTEM, COMMENT DISTRIBUTION SERVER, TERMINAL, COMMENT DISTRIBUTION METHOD, AND PROGRAM

CROSS REFERENCE TO RELATED APPLICATION

This application is a continuation application and claims the benefit of and priority to U.S. patent application Ser. No. 18/012,646, filed on Dec. 22, 2022, entitled, "COMMENT DISTRIBUTION SYSTEM, COMMENT DISTRIBUTION SERVER, TERMINAL, COMMENT DISTRIBUTION METHOD, AND PROGRAM," which claims the benefit of and priority to PCT/JP2021/026480, filed on Jul. 14, 2021, entitled (translation), "COMMENT DISTRIBUTION SYSTEM, COMMENT DISTRIBUTION SERVER, TERMINAL, COMMENT DISTRIBUTION METHOD, AND PROGRAM," which claims the benefit of and priority to Japanese Patent Application No. 2020-127116, filed on Jul. 28, 2020, which are hereby incorporated by reference in their entirety into this application.

TECHNICAL FIELD

The present invention relates to a comment distribution system, a comment distribution server, a terminal, a comment distribution method, and a program.

BACKGROUND TECHNOLOGY

A service that enables viewing video delivered via a network and posting comments regarding the videos is widely used. Posted comments are displayed in a comment field provided outside the video display area or displayed superimposed on the video within the video display area. In a so-called live broadcast program, where video is delivered in real time, comments posted by viewers can be read out loud by the contributor, allowing communication between viewers and the contributor.

RELATED ART DOCUMENTS

Patent Document

Patent Document 1: Japanese Patent publication 6295494
Patent Document 2: Japanese Unexamined Patent Application 2011-118730

SUMMARY OF THE INVENTION

Problem to be Solved by the Invention

However, since a large number of viewers submit a large number of comments on popular programs, the comments superimposed on the screen overlap each other and become difficult to read.

In Patent Document 1, the comments are displayed both on the screen and in a comment field, so the contributor can check the comments posted in the comment field, but if a large number of comments are posted, the distributor cannot read all the comments in the comment field. As a result, viewers who had been able to communicate with the contributor when there were fewer viewers of the program may leave.

In Patent Document 2, comments to be delivered are extracted based on attribute information of the posted comments and only extracted comments are delivered so even if a large number of comments are posted, the number of comments delivered is suppressed to a number that viewers can grasp. However, if comments delivered are thinned out, the level of excitement for the program becomes difficult to visualize based on the number of comments posted. In addition, thinning out leads to comments not being delivered and so may discourage posting of comments and also may discourage viewing the program.

In light of the problems described above, an object of the present invention is appropriate processing of comments without discouraging posting of comments.

Means to Solve the Problem

An aspect of a comment distribution system of the present invention includes:
  a video distribution server that distributes video;
  a comment distribution server that distributes comments input regarding the video; and
  a terminal that displays the video and comments received; wherein the comment distribution server includes:
  a receiving part that receives the comment;
  a classifying part that classifies the comments into first comments that are displayed on both the video display area and a comment field outside the video display area and second comments displayed only in the comment field; and
  a distributing part for distributing the first comments and the second comments; and the terminal includes:
  a video display part that displays the received video;
  a comment receiving part for receiving the first comments and the second comments; and
  a comment display part for displaying the first comments and second comments in the comment field outside the video display area and displaying the first comments in the video display area.

Effect of the Invention

With the present invention, comments can be processed appropriately without discouraging posting of comments.

DESCRIPTION OF THE PREFERRED EMBODIMENTS

Figure 1:
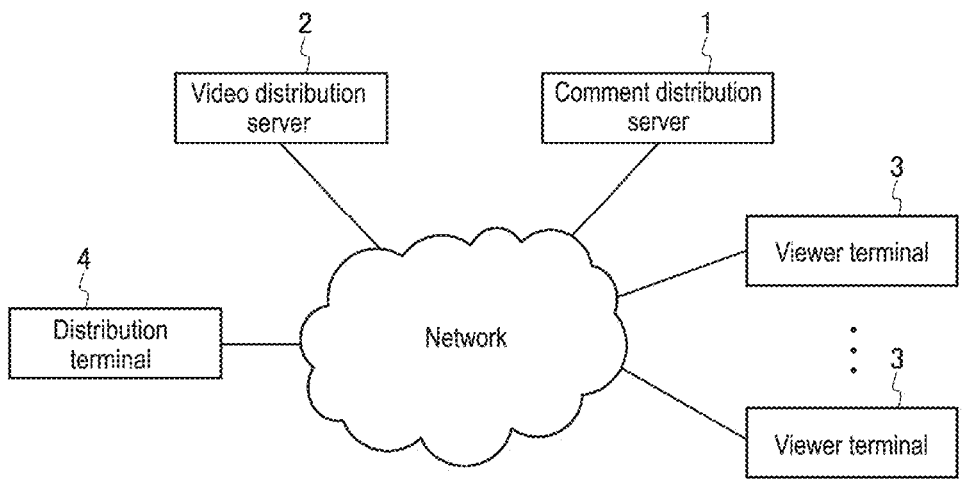
FIG. 1 illustrates an example of a comment distribution system configuration according to the present Embodiment.

Embodiments of the present invention will hereinafter be described with reference to the drawings.
System Configuration
FIG. 1 illustrates an example of a comment distribution system configuration according to the present Embodiment. The comment distribution system illustrated in FIG. 1 includes a comment distribution server 1, a video distribution server 2, a viewer terminal 3, and a contributor terminal 4. Each device is connected so as to enable communication via a network. There are only two viewer terminals 3 in FIG. 1 but the number is not limited to this. There are many viewers and many viewer terminals 3 are connected. In addition, only one contributor terminal 4 is illustrated; however, in actuality there are a plurality of contributor terminals 4 connected. Viewers can select the program of the contributor they want to watch.

The contributor terminal 4 is a terminal used by the contributor to distribute a program, and a recorded video is uploaded to the video distribution server 2 in real time. For example, the contributor terminal 4 uploads images captured by a camera connected to the contributor terminal 4 to the video distribution server 2 in real time. The contributor terminal 4 can also upload images input from an external device such as a game console to the video distribution server 2.

The video distribution server 2 distributes the video received from the contributor terminal 4 to the viewer terminal 3 in real time. In other words, the contributor is delivering a live broadcast program. The distribution of live broadcast programs is also referred to as a streaming distribution. Here, a live broadcast program was described as an example, but the present invention is also applicable to a time shift distribution where a live broadcast program is recorded on the video distribution server 2 and the video is distributed at a different time.

The viewer terminal 3 is a terminal used by viewers to view a program and receives and displays video from the video distribution server 2. When a viewer operates the viewer terminal 3 and selects a program to watch, a video distribution request is sent to the video distribution server 2. Upon receipt of the distribution request, the video distribution server 2 starts sending the requested video to the viewer terminal 3.

The comment distribution server 1 receives comments input by the viewer regarding the video from the viewer terminal 3 and distributes the received comment in real time to the contributor terminal 4 that is delivering video to the viewer terminal 3 receiving video distribution. The comment distribution server 1 manages comments received from the viewer terminal 3 for each video. Upon receipt of a distribution request from the viewer terminal 3, the video distribution server 2 provides notification of information identifying the viewer terminal 3 and information identifying the requested video to the comment distribution server 1. The comment distribution server 1 starts sending comments corresponding to the video to the viewer terminal 3 and receiving comments from the viewer terminal 3. Comment distribution can use the technology described in Patent Document 1.

The comment distribution server 1 classifies received comments into comments displayed in the video display area (hereinafter called "first comments") and comments not displayed in the video display area (hereinafter called "second comments") and sends the first comments and second comments to the viewer terminal 3 and the contributor terminal 4.

If the received comment is a first comment, the viewer terminal 3 displays the comment both in the video display area and the comment field outside the video display area. In the case the received comment is a second comment, the viewer terminal 3 displays the comment only in the comment field. In other words, the viewer terminal 3 displays all of the comments (first comments and second comments) in the comment field but displays only the first comments in the video display area. In a similar manner, the contributor terminal 4 displays the first comments in the video display area and the comment field and displays the second comments only in the comment field.

Server Configuration and Terminal Configuration

Next, a configuration example of the comment distribution server 1 and the viewer terminal 3 will be described.

Figure 2:
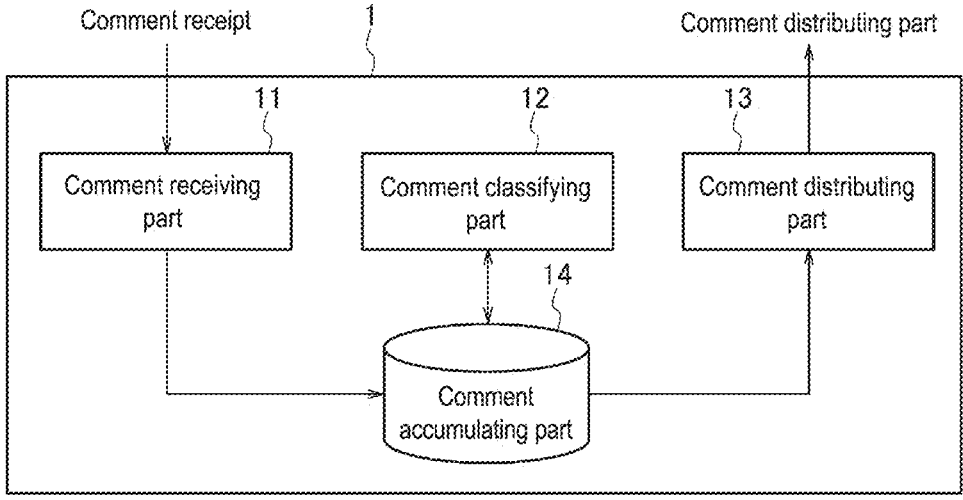
FIG. 2 illustrates an example of a comment distribution server configuration.

FIG. 2 illustrates an example of a comment distribution server 1 configuration. The comment distribution server 1 illustrated in FIG. 2 includes a comment receiving part 11, a comment classifying part 12, a comment distributing part 13, and a comment accumulating part 14.

The comment receiver 11 receives comments from the viewer terminal 3 and stores the received comments in the comment accumulating part 14.

The comment accumulating part 14 accumulates comment content, comment submitter information, and the time the comment was posted. The content of the comment is basically a string of text, but the content may also be an image, such as a so-called stamp. The comment submitter information is the name of the submitter or an identifier of the submitter. Comment submitters are also viewers. The time the comment was posted is, for example, the playback time (time stamp) of the video when the viewer sent the comment. This information is included with the comments received. Received comments include an identifier indicating which video the comment is related to. In addition to the information described above, a comment number indicating the order in which comments were received and a comment display method specifying the manner in which comments are to be displayed may also be accumulated.

The comment classifying part 12 classifies the received comments based on classification criteria, in other words, the comments accumulated in the comment accumulating part 14 into first comments and second comments. The comment classification results are saved in the comment accumulating part 14. For example, comments classified as first comments can be flagged. For example, submitter attributes or comment attributes can be used as the classification criteria.

The comment distributing part 13 reads comments from the comment accumulating part 14 and distributes the comments including type as first comment or second comment to the viewer terminal 3 and the contributor terminal 4. In the case of a live broadcast, comments are accumulated one after another as the program progresses so the comment distributing part 13 reads and distributes the newly accumulated comments.

In time-shift delivery, the comment distributing part 13 sends comments accumulated in the comment accumulating part 14 according to the playback time timestamp of the video.

Figure 3:
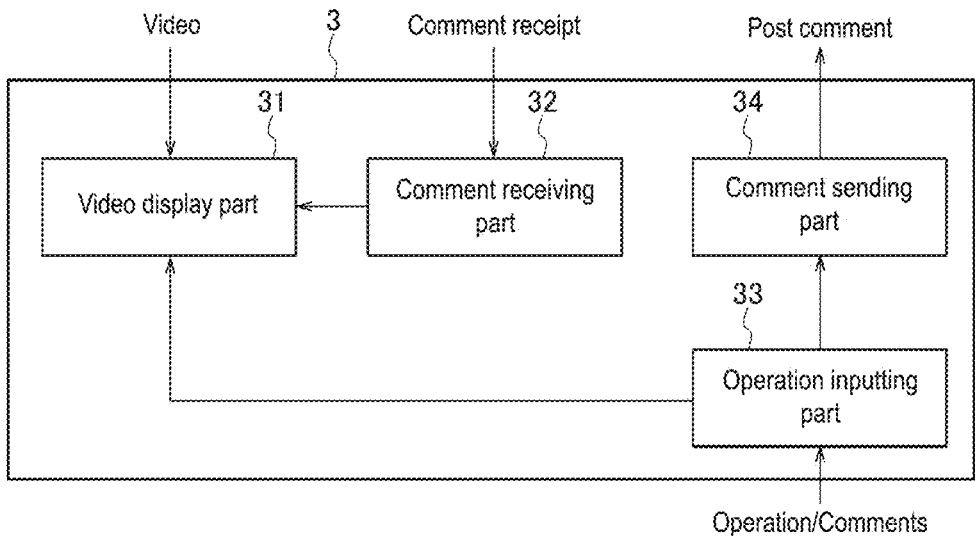
FIG. 3 illustrates an example of a viewer terminal configuration.

FIG. 3 illustrates an example of a viewer terminal 3 configuration. The viewer terminal 3 illustrated in FIG. 3 includes a video display part 31, a comment receiving part 32, an operation inputting part 33, and a comment sending part 34. Note, the contributor terminal 4 and viewer terminal 3 have the same configuration, displaying distributed video, and comments.

The video display part 31 sends a request for distribution of a video specified by the viewer to the video distribution server 2 and receives and displays the video sent from the video distribution server 2.

The comment receiving part 32 receives comments input regarding the video being viewed from the comment distribution server 1 and displays the comments on the video display part 31.

The video display part 31 displays the comments in the comment field and in the case where the comment is a first comment, superimposes the comment on the video.

The operation inputting part 33 inputs operations from the viewer. For example, the operation inputting part 33 inputs operations for selecting a video, operations regarding the video, and comments regarding the video.

The comment sending part 34 sends comments input using the operation inputting part 33 to the comment distribution server 1. Sent comments include comment content, information identifying the video being viewed, viewer identifying information, and a timestamp of when the comment was input. Comments may include additional information such as display format.

The contributor terminal 4 can read the first comments superimposed on the video. For example, in the case of distributing a live broadcast program of a contributor playing a game, the contributor can not take their eyes off of the game screen so text to speech software installed on the contributor terminal 4 can be caused to read the comments. The audio of the comments read is delivered together with the video. When the number of comments increases, the comments superimposed on the video are thinned out so there is not a large delay in the reading software enabling reading of comments in real time.

Note that each of the parts of the comment distribution server 1 and viewer terminal 3 are constituted by a computer including an arithmetic processing unit, a memory device, and the like and processing for each part is executed by a program. The program is stored in a storing device included in the comment distribution server 1 and the viewer terminal 3 and recording on recording media such as a magnetic disc, an optical disc, or semiconductor memory can be provided through a network.

Note that a portion of the functions of the comment distribution server 1 can be provided in the viewer terminal 3. For example, the viewer terminal 3 can be provided with the comment classifying part 12 enabling criteria-based classifying of received comments.

Display Screen

Figure 4:
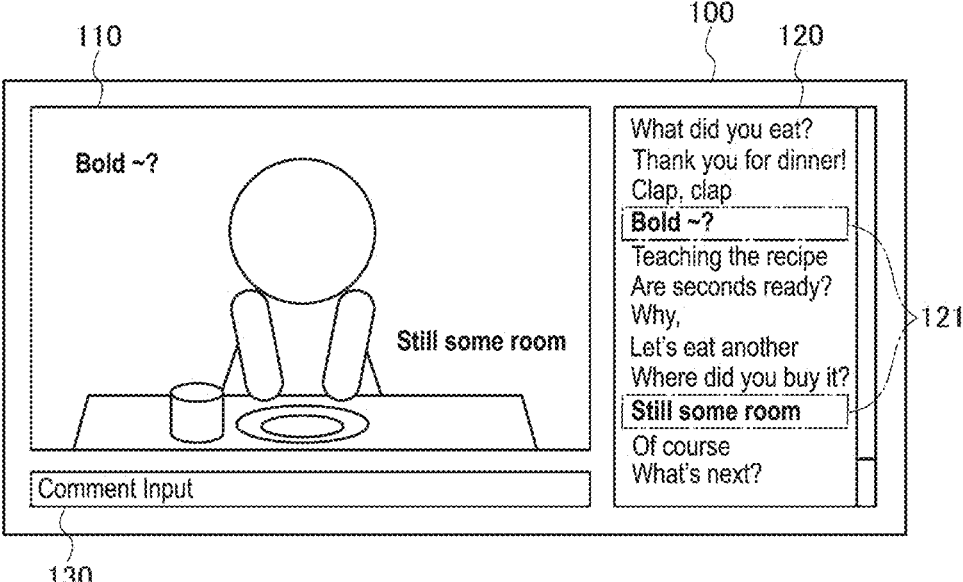
FIG. 4 illustrates an example of a display screen.

A display example of the viewer terminal 3 will be described with reference to FIG. 4. The display screen 100 of FIG. 4 includes a video display area 110, a comment field 120, and a comment input field 130.

Distributed video is displayed in the video display area 110 and the first comments are superimposed on the video. Although not illustrated, operation buttons such as volume adjustment, a video playback button, a video pause button, and a maximize display button can be included in the video display area 110 and video playback time, length of video playback time, and similar information related to the video can also be displayed.

On the video display area 110, comments appear on the right edge and move toward the left edge at an arbitrary movement speed. The position of appearance, direction of movement, and movement speed of the comments may be set arbitrarily by the viewer terminal 3, or may be specified in the additional information of the comments. Note that the display method of comments in the video display area 110 is not limited to this.

The first comments and second comments are displayed in chronological order in the comment field 120. In other words, the content of all of the comments received by the viewer terminal 3 are displayed in chronological order in the comment field 120. Of the comments displayed in the comment field 120, comments classified as first comments are also displayed in the video display area 110. In the example of FIG. 4, the comment indicated with code 121 is a first comment and is displayed in both the comment field 120 and the video display area 110. In the comment field 120, display format such as color, size, font, or the like can be changed to enable distinguishing between first comments and second comments and displaying in the same display format so that first comments and second comments can not be distinguished is also feasible. The display format of first comments in the comment field 120 can be changed from the display format of the second comments during the period the first comment is displayed in the video display area 110.

When the viewer hovers the mouse cursor over a comment in the comment field 120, information for that comment may be displayed. For example, information like submission time and the name of the submitter can be displayed in a popup for the comment selected using the mouse cursor.

When a new comment is received by the viewer terminal 3, the new comment is added to the display at the bottom of the comments displayed in the comment field 120. If comments displayed reach the bottom of the comment field 120, the comments being displayed are scrolled upwards and the new comment is displayed at the bottom of the comment field 120. If a large number of comments are posted, the comments in the comment field 120 scroll at a fast speed. Even if the comments displayed in the video display area 110 are thinned out, visualization of the excitement regarding the program can be achieved by the speed at which the comments scroll. The viewer can operate a scroll bar of the comment field 120 and scroll the comments of the comment field 120 in an arbitrary direction, enabling confirming past comments.

Viewers input comments regarding the video in the comment input field 130. The comments that are input are sent to the comment distribution server 1 and distributed by the comment distribution server 1. The viewer's own comments distributed by the comment distribution server 1 are classified as first comments or second comments similar to comments input by other viewers and are displayed in the comment field 120 and the video display area 110.

Figure 5:
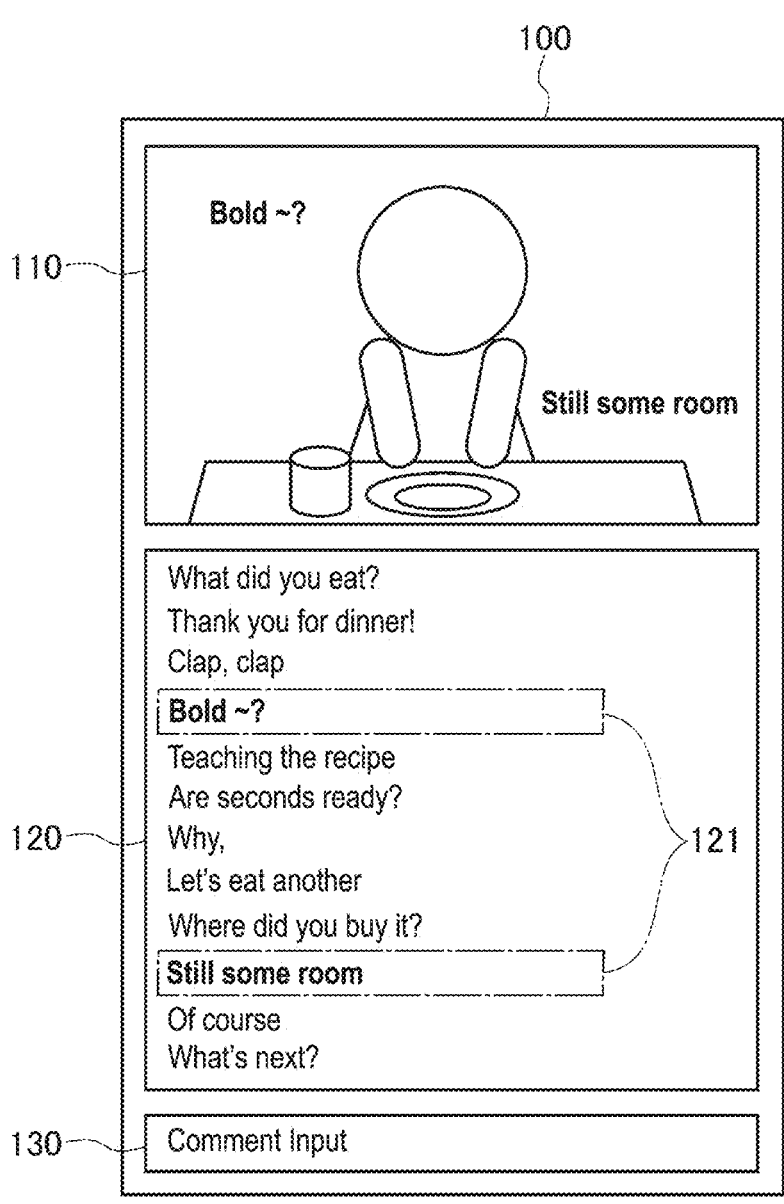
FIG. 5 illustrates an example of a display screen.

FIG. 5 is an example of a display screen when a mobile terminal with a long vertical display screen such as a smartphone is used as the viewer terminal 3. In the long vertical display screen 100, the video display area 110, comment field 120, and comment input field 130 are one on top of another vertically.

Server and Terminal Operation

Next, operation of the comment distribution server 1 and the viewer terminal 3 will be described.

Figure 6:
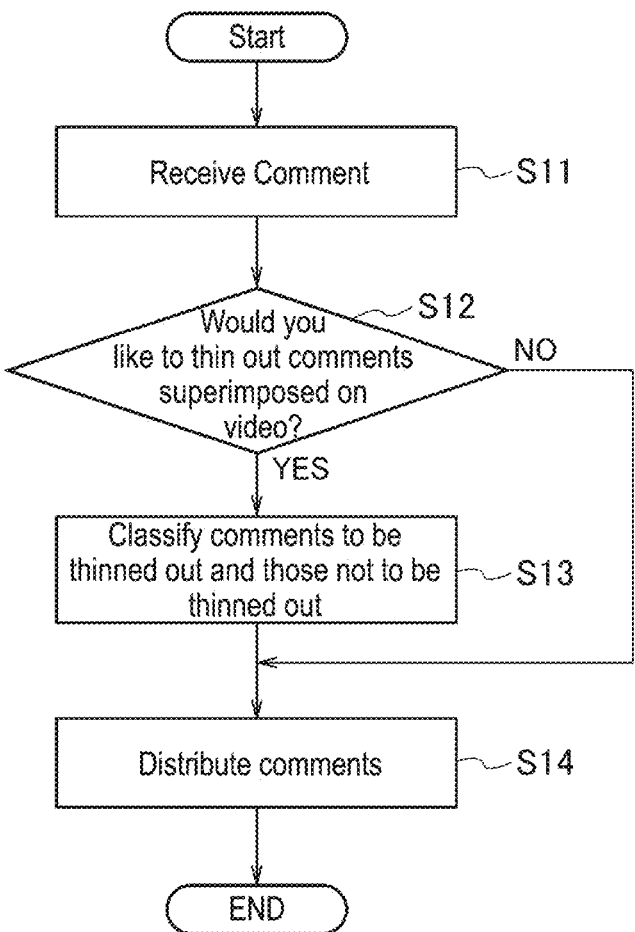
FIG. 6 is a flowchart illustrating an example of a process flow of a comment distribution server.

FIG. 6 is a flowchart illustrating an example of a process flow of a comment distribution server 1. The comment distribution server 1 starts distributing comments to the viewer terminal 3.

In step S11, the comment distribution server 1 receives comments from the viewer terminal 3. Here, the comments received are comments input regarding the video being viewed out of what is being viewed.

In step S12, the comment distribution server 1 determines whether or not to thin out the comments superimposed on the video. In other words, the comment distribution server 1 determines whether to classify the received comments as first comments or second comments The comment distribution server 1 determines to display all comments received superimposed on the video if the number of comments per unit time is low and determines to thin out comments for display superimposed on the video if the number of comments per unit time exceeds criteria. For example, if the number of comments per second is 10 or more, the comment distribution server determines to thin out the comments. If comments are not thinned out, processing proceeds to step S14.

If comments are thinned out, in step S13, the comment distribution server 1 classifies the received comments as thinned out comments (second comments) and not thinned out comments (first comments) based on classification criteria. Details of the classification of comments are described below.

In step S14, regardless of the comment classification results, the comment distribution server 1 distributes all of the corresponding comments received to the viewer terminal 3 where the video is being viewed. Here, if the comment distribution server 1 classifies the comments in step S13, the comments are distributed with the classification results attached. For example, the comment distribution server attaches information of not superimposing on the video to second comments. In live broadcast programs, the comment distribution server 1 distributes all comments to the distributor terminal 4 as well as to the viewer terminal 3.

Note that when comments are received in step S11, comments with inappropriate content can be filtered. For example, if a comment with inappropriate content is received in step S11, the comment distribution server 1 can discard the received comment and close processing regarding that comment.

In addition, in step S12, the contributor may specify whether or not to perform thin out processing of the comments. The contributor should be able to set up a section where comments are not thinned out. If the contributor sets non-use of thinning out comments, processing proceeds to step S14 even if comment thinning out conditions are applicable in step S12. For example, a contributor can set a section where they are singing to have no thinning out of comments as a means of raising excitement while the contributor is singing, thus suppressing the effect of thinning out processing on comment art expressed as a picture combining a barrage of text from comments.

Alternatively, depending on the situation for the contributor, determination can be made to not thin out comments even if conditions for thinning out comments in step S12 are applicable. For example, the line of sight of the contributor can be detected from the video being distributed and determination can be made to not thin out comments even if conditions for thinning out comments in step S12 are applicable if the contributor is not looking at the screen. Alternatively, the size of the face of the contributor can be detected from the video and if the face area is smaller than a criterion, it is considered that the contributor is separated from the contributor terminal 4 and not reading comments so even if conditions for thinning out comments in step S12 are applicable, determination can be made to not thin out comments.

Figure 7:
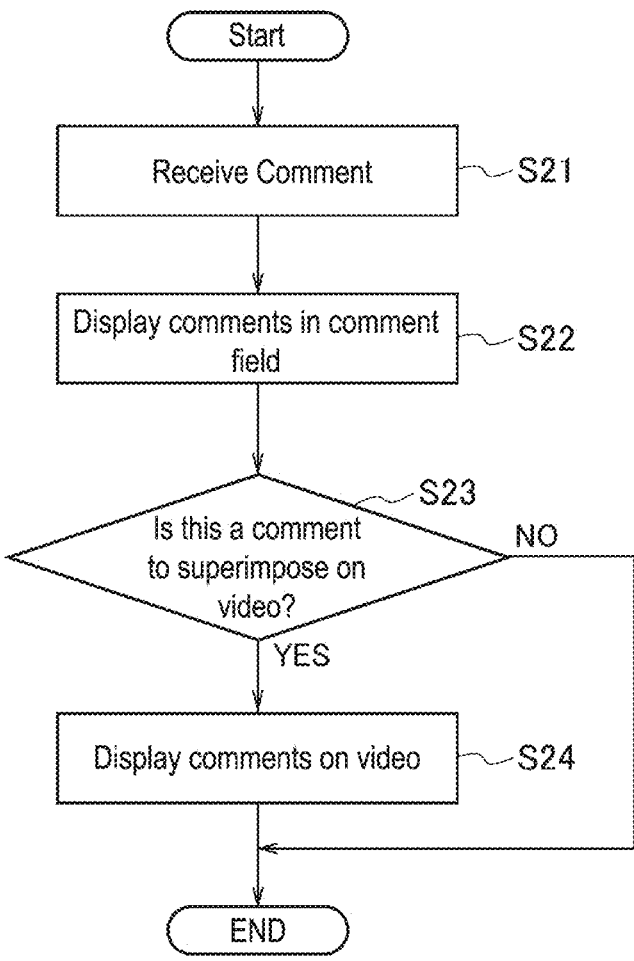
FIG. 7 is a flowchart illustrating an example of a process flow of a viewer terminal.

FIG. 7 is a flowchart illustrating an example of a process flow of a viewer terminal 3.

In step S21, the viewer terminal 3 receives comments from the comment distribution server 1.

In step S22, the viewer terminal 3 displays the received comments in the comment field.

In step S23, the viewer terminal 3 determines whether or not to superimpose the received comments on the video. If the comments are not superimposed on the video, in other words, if the received comments are classified as second comments, processing is closed.

In the case that comments are displayed superimposed on the video, in other words if received comments are classified as first comments, in step S24, the viewer terminal 3 superimposes the comments on the video.
Comment Classification Criteria Attribute information of the comment submitter can be used as comment classification criteria.

For example, membership type (general member, paid member, or the like) may be used as attribute information for comment submitters. The comment distribution server 1 assigns priority to comments according to membership type of comment submitters and extracts comments to not be thinned out in order of highest priority until a prescribed number is reached. A ratio of number of comments per level of priority may also be determined. For example, the comment distribution server 1 extracts comments from paying members until a prescribed number A is reached, and comments from general members until a prescribed number B is reached. The extracted comments are set as first comments. Thus, comments are more readily superimposed on the video in accordance with membership type.

Alternatively, the level of participation in programs of the contributor (number of past views and comments) can be used as attribute information of the comment submitter. The comment distribution server 1 retains viewing history (may include comment history) of viewers for each contributor. The comment distribution server 1 assigns priority to comments according to the viewing history of comment submitters and extracts comments to not be thinned out in order of highest priority until a prescribed number is reached. Comments from viewers with a high number of views and comments will be given high priority. Comments from first time viewers or initial comments of viewers may be given high priority. The contributor or distribution system may flag viewers as favorable viewers.

Attribute information of the comment submitter themselves such as gender, age, or the like may be used. For example, the contributor can register submitter attributes to prioritize (gender or age) in the comment distribution server 1. The comment distribution server 1 assigns priority to comments according to attributes of comment submitters and extracts comments to not be thinned out in order of highest priority until a prescribed number is reached.

In addition, attribute information of the comment may be used as comment classification criteria. For example, enabling posting a comment together with payment of a fee from the viewer terminal 3. The comment distribution server 1 classifies comments for which payment has been paid as first comments. By paying a fee, comments from a viewer will not be thinned out and can be superimposed on the video.

In addition, content of the comment may be used as comment classification criteria. For example, a comment is classified as a first comment if the comment has a prescribed number of characters or more and makes sense or comments that are a character string that liven up the video and make the program exciting are classified as first comments.

As described above, the comment distribution system of the present Embodiment includes a contributor terminal 4, a video distribution server 2, a comment distribution server 1 that distributes comments input regarding the video, and a viewer terminal 3 for displaying the video and comments received. The comment distribution server 1 includes a comment receiving part 11 for receiving comments, a comment classifying part 12 for classifying the comments into first comments that are displayed in a video display area and in a comment field outside the video display area and second comments that are displayed only in the comment field, and a comment distributing part 13 for distributing the first comments and the second comments. The viewer terminal 3 includes a video display part 31 for displaying video received and a comment receiving part 32 for receiving the first comments and the second comments. The video display part 31 displays the first comments in both the video display area and the comment field and displays the second comments in only the comment field. Thus, comments superimposed on the video display area are thinned out so comments can be read even if a large number of comments are posted while all comments posted are displayed in the comment field so the number of comments in the comment field enable visualization of program excitement and comments are not wasted.

The comment distribution server 1 according to the present Embodiment can promote fee based membership contracts by classifying comments as first comments or second comments according to the membership type of the comment submitter.

By classifying comments into first comments and second comments based on comment attributes or comment content, the comment distribution server 1 can suppress the effect on comment art that generates program excitement through a barrage of comments superimposed on the video.

EXPLANATION OF CODES

1. Comment distribution server
11. Comment receiving part
12. Comment classifying part
13. Comment distributing part
14. Comment accumulating part
2. Video distribution server
3. Viewer terminal
31. Video display part
32. Comment receiving part
33. Operation inputting part
34. Comment sending part
4. Contributor terminal
100. Display screen
110. Video display area
120. Comment field
130. Comment input field
The invention claimed is:

1. A comment distribution system, comprising:
a video distribution server configured to distribute a video;
a comment distribution server configured to distribute comments input regarding the video; and
a terminal configured to display the video and comments received,
wherein the comment distribution server includes:
a receiving part configured to receive the comments;
a classifying part configured to classify the comments into first comments displayed on a first comment field and second comments displayed on a second comment field; and a distributing part configured to distribute the first comments and the second comments; and
wherein the terminal includes:
a video display part configured to display the received video;
a comment receiving part configured to receive the first comments and the second comments; and
a comment display part configured to display the first comments in the first comment field and displaying the second comments in the second comment field, and
the comment display part is further configured to not display the second comments in the first comment field.

2. The comment distribution server according to claim 1, wherein the comment display part is further configured to display the first comments in the second comment field.

3. The comment distribution server according to claim 1, wherein the second comment field is outside the video display area.

4. The comment distribution server according to claim 1, wherein the classifying part is configured to classify the comments into the first comments and the second comments without thinning the comments.

5. The comment distribution server according to claim 1, wherein the classifying part is configured to thin the comments.

6. The comment distribution server according to claim 1, wherein the video distribution server is configured to distribute a video to the terminal;
wherein the comment distribution server is configured to distribute the first comments and the second comments to the terminal; and
wherein the terminal is configured to display the video, the first comments and the second comments.

7. The comment distribution server according to claim 1, wherein the video distribution server is configured to record a live broadcast program and distribute the video recorded a live broadcast program at a different time than it was broadcast.

8. A terminal, comprising:
a comment receiving part configured to receive a first comments and a second comments from a comment distribution server; and
a video display part configured to display the received video; and
a comment display part configured to display the first comments in the first comment field and displaying the second comments in the second comment field;
wherein the comment display part is further configured to not display the second comments in the first comment field.

9. A comment distribution method, comprising:
receiving a first comments and a second comments from a comment distribution server;
displaying a received video; and
displaying the first comments in the first comment field and displaying the second comments in the second comment field, wherein the second comments are not displayed in the first comment field.

* * * * *